United States Patent Office 3,414,413
Patented Dec. 3, 1968

3,414,413
EDIBLE COMPOSITION AND METHOD OF MAKING THE SAME
Harry M. Levin, Philadelphia, Pa., assignor to HCA Food Corporation, Baltimore, Md., a corporation of Maryland
No Drawing. Filed Feb. 1, 1966, Ser. No. 523,883
5 Claims. (Cl. 99—144)

ABSTRACT OF THE DISCLOSURE

A mayonnaise like food product in which the emulsion is fortified by not more than 1% by wt. of sodium carboxy methyl cellulose to resist oil and water separation when subjected to low temperatures or jostling.

---

My invention is an emulsified edible composition similar to standard mayonnaise in which the emulsion is fortified by the use of a cellulose derivative. Such cellulose derivative serves as a dispersing agent as well as supplementing the emulsifying characteristics of eggs and egg yolks.

The principal object of my invention is to provide a mayonnaise-like composition which will resist unusual jostling in transportation without breaking the emulsion and when subjected to low temperature will show neither oil nor water separation.

A further object of my invention is to enable the mayonnaise-like composition to retain the necessary predetermined quantity of nitrogen incorporated in the composition as an anti-oxidant.

A still further object of my invention is to provide an emulsifier or film former which will complement the emulsifying characteristics of the eggs and at the same time form a combination which will bind or adsorb water as strongly as egg albumin and yet will retain the egg yolk adhesive syrupy consistency.

In acordance with my invention a small amount of a cellulose derivative, preferably carboxymethylcellulose—known as CMC, fortifies the egg yolk and serves as a dispersing agent. Such cellulose derivative not only supports the egg yolk in the emulsification but permits the use of less eggs without the breaking down of the protective film enveloping the colloids. The use of CMC presupposes a minimum oil content in the composition of approximately 65% and should not be less than 55%, otherwise the CMC will act as a filler and binding agent and create a gummy mass instead of the stiff, dry, whipped characteristics of a mayonnaise. My invention may be used with any mayonnaise type dressing that does not require a starch filler for proper consistency.

CMC, unlike vegetable gums, such as locust bean gum used in salad dressing, does not resist the effects of high temperature required for salad dressing during the cooking operation nor does it behave well under conditions of high acidity. Salad dressing is higher in acidity than mayonnaise and is cooked to a temperature anywhere from 185° to 200° F. When CMC is used under acidic conditions a hydrolytic type of degradation takes place and the rate of such degradation increases as the temperature is increased. Likewise, the high sugar content of salad dressing inhibits the reaggregation of gel centers. Accordingly, CMC does not act as a protective film for starch granules in salad dressing. The quantities of sugar present in salad dressings causes the CMC to impart gumminess to the solution. Furthermore, long continued agitation, such as used in salad dressing mixtures causes a decrease in the viscosity of the CMC gum. The latter is believed to be due to a mechanical breakdown of the cellulose gum chains as a result of the application of pressure which breakdown causes weaker interlacing as well as lower viscosity and more gumminess. The use of CMC in salad dressing in place of locust bean gum would result in a more or less gummy substance whereas a good mayonnaise should show a coarse, dry texture having a whipped and smooth consistency combined with spreadability. Thus, there is little or no purpose in using CMC in connection with salad dressing.

I have found that although CMC is not really useful in salad dressing that small amounts of CMC are very useful in mayonnaise where little or no starch or sugar is present and imparts to mayonnaise a desirable texture and rigidity as well as a dry form. It is my belief that it is useful in mayonnaise because of the fact that it does not have to combat the weak molecular maladjustment of the starch granules found in salad dressing. I am of the belief also that the cellulose gum retains some of the fibrous structure of the original cellulose even after modification by chemical treatment and that fibrous structure is responsible for the production of the desirable texture noted.

The CMC in a low starch or starchless and low sugar or sugarless composition not only fortifies the egg yolk but serves as a dispersing agent enabling the oil globules to be colloidally dispersed in a liquid medium. At the same time the CMC enables the egg yolk, even though of small percentage, to envelope the colloids and form a protective film around them. The smaller the globules the thinner is the protection provided by the egg yolk. The amount of CMC to be used will vary as the amount of egg yolk and moisture varies but I have found it preferable to use 6–7 oz. of CMC per excess gallon of moisture as shown below. I have found that the use of about 5 oz. will produce a composition that is too thin and the use of as much as 9 oz. will result in a composition that will readily clot in cold storage, will lack a creamy spreadability and will have a thick and gelatinous appearance.

Specifically illustrating quantitatively how CMC serves to enhance emulsifying properties of egg yolks and/or whole eggs and its efficacy to bind surplus moisture (vinegar and water) in mayonnaise and at the same time keep the colloidally dispersed oil globules in uniform suspension, it is necessary to understand the following two principles that I discovered as essential in the manufacture of mayonnaise:

(a) *Mayonnaise without CMC.*—A pure and stable semisolid heavy texture mayonnaise should contain at least 6% by weight of egg yolks (10% salt or sugar) or a proportionate increase in mixed (yolk and whole) eggs; about 80 to 81% vegetable oil and about 3% of dry spices (which is, of course, subject to modification to meet flavor specification) and the total moisture excluding the moisture in the yolks ought not to exceed 10% by weight of the total composition.

EXAMPLE 1

| Mayonnaise without CMC | Lbs. | Percent |
|---|---|---|
| Vegetable oil | 646 | 80.75 |
| Salt egg yolks | 50 | 6.25 |
| Vinegar and water and/or lemon juice | 80 | 10 |
| Spice and flavoring agents | 24 | 3 |
| Total batch | 800 | 100 |

The above batch, approximately 100 gallons, contains 10% moisture and approximately 6% yolks and approximately 81% oil.

However, any moderate (1–2%) increase in moisture, with a corresponding reduction in oil percentage would weaken the texture of the mayonnaise but without serious consequences. However, a drastic increase in moisture, say from 5 to 10%, without increasing the egg content would affect the stability of the mayonnaise and cause syneresis. However, by increasing the percentage of yolks beyond the 6% above indicated, by 1% for every 1 to 1½% moisture in excess of the 10% moisture originally indicated, stability can be maintained. For example, mayonnaise with anywhere from 8 to 9% egg yolks may contain about 12 to 13% moisture (in addition to the moisture in the egg) so that the surplus of egg yolk with the surplus of moisture may replace its equivalent in oil thus reducing the oil to about 74 to 75%.

EXAMPLE 2

| Mayonnaise without CMC | Lbs. | Percent |
| --- | --- | --- |
| Vegetable oil | 592 | 74 |
| Salt yolks | 68 | 8.5 |
| Vinegar, water and/or lemon juice | 100 | 12.5 |
| Sugar, spice and flavoring agents | 40 | 5 |
| Total batch | 800 | 100 |

In another instance, mayonnaise with 13% yolks may contain about 66% oil and about 16 to 17% moisture, subject to slight variation due to possible increase in sugar and/or dry spices employed for flavor. An increase in moisture necessitates an increase in vinegar for preservative and flavoring purposes and thus necessitates an increase in sugar, as in the example below

EXAMPLE 3

| Mayonnaise without CMC | Lbs. | Percent |
| --- | --- | --- |
| Vegetable oil | 528 | 66 |
| Salt yolks | 104 | 13 |
| Vinegar, water and/or lemon juice | 128 | 16 |
| Sugar, spice and flavoring agents | 40 | 5 |
| | 800 | 100 |

(b) Mayonnaise containing CMC.—While I found it necessary to add one unit of egg yolk above the 6% mentioned above for each 1 to 1½ units of increased moisture over and above the 10% as indicated above, the examples below indicate the necessity of only 6 to 7 oz. of CMC for each gallon (128 oz.) of moisture in excess of the 10% total moisture, or only .02% to .036% CMC for each 1% increase in moisture without increasing the yolks above the 6% cited above. Thus, commercially feasible mayonnaise with only a fractional increase in cost of the CMC involved may contain only about 60–68% oil. The examples will also indicate that when oil is reduced from 80% downward to about 72% with a corresponding increase of moisture from 10% to about 15%, all we need is only 6 oz. of CMC for each gallon of increased moisture. Should the total moisture be increased above 15% of the total composition, I found it desirable to slightly increase the CMC above the 6 oz. per gallon moisture— to be more specific, about ¼ of an ounce per gallon more than the 6 oz. for every gallon of moisture until the moisture reaches approximately 20% of the total composition. However, after the total moisture reaches about 20% or more then the most beneficial result is obtained by incorporating 7 oz. of CMC for each gallon of moisture in excess of the 10% moisture indicated above.

EXAMPLE 1

| Stable mayonnaise containing CMC | Lbs. | Percent |
| --- | --- | --- |
| Vegetable oil | 622.00 | 77.75000 |
| Salt yolks | 49.00 | 6.12500 |
| Vinegar, water and/or lemon juice | 97.00 | 12.12500 |
| Sugar, spices and flavoring agents | 31.25 | 3.90625 |
| CMC | 0.75 | 0.09375 |
| Total batch | 800.00 | 100.00 |

In the above illustration we have approximately 2 gallons of moisture in excess of the 10% cited above. Therefore, at the rate of 6 oz. of CMC per gallon, we will need approximately 12 oz. which is substantiated above and at the same time only about 6% egg yolk is employed.

EXAMPLE 2

| Stable mayonnaise containing CMC | Lbs. | Percent |
| --- | --- | --- |
| Vegetable oil | 547 | 68.375 |
| Salt yolks | 48 | 6.000 |
| Vinegar, water and/or lemon juice | 155 | 19.375 |
| Sugar, spices and flavoring agents | 46 | 5.750 |
| CMC | 4 | 0.500 |
| Total batch | 800 | 100.00 |

In the above illustration 10% moisture would be 80 lbs. as against 155 actually used which is slightly above 9 gallons of moisture in excess of the 10% needed for 6% yolk. Since as explained above we would need 7 oz. of CMC for excess gallon of moisture, the 4 lbs. of CMC necessary is substantiated above.

EXAMPLE 3

| Stable mayonnaise containing CMC | Lbs. | Percent |
| --- | --- | --- |
| Vegetable oil | 480 | 60.000 |
| Salt yolks | 48 | 6.000 |
| Vinegar, water and/or lemon juice | 213 | 26.625 |
| Sugar, spices and flavoring agents | 52 | 6.500 |
| CMC | 7 | 0.875 |
| Total batch | 800 | 100.00 |

In this example we have 213 lbs. total moisture less 80 lbs. (10% of the total) or 133 lbs. excess moisture the equivalent of 16 gallons. At the rate of 7 oz. CMC per gallon, 7 lbs. CMC is thus required.

EXAMPLE 4

| Stable mayonnaise containing CMC | Lbs. | Percent |
| --- | --- | --- |
| Vegetable oil | 438 | 54.750 |
| Salt yolks | 48 | 6.000 |
| Vinegar, water and/or lemon juice | 253 | 31.625 |
| Spice and flavoring agents | 52 | 6.500 |
| CMC | 9 | 1.125 |
| Total batch | 800 | 100.00 |

In this example we have 253 lbs. total moisture less 80 lbs. (10% of the total) or 173 lbs. excess moisture the equivalent of 20.8 gallons. At the rate of 7 oz. of CMC per gallon, 9 lbs. of CMC is thus required.

The steps used to incorporate the above ingredients are as follows:

In the bottom of the premixing tank place the liquids, dry spices and flavoring agents, such as sugar, salt and mustard and mix thoroughly into a paste. Then add the yolks and thoroughly agitate to produce a uniform mixture of eggs, liquids and dry ingredients. To incorporate the CMC, first take the total CMC and mix an average of 1 to 2 lbs. in a gallon of vegetable oil thoroughly so that each particle of CMC is lubricated. In order to keep the egg and spice mixture creamy and to maintain the adhesive qualities, only ½ or ⅓ of the CMC/oil mixture is added slowly to the premixing tank to improve the emulsifying qualities of the egg yolks or whole eggs and at the same time prevent excessive thickness. After this is accomplished, the balance of the oil and vinegar is added slowly while the premixer agitates the entire composition at high speed. Simultaneously, the balance of the CMC/oil mixture is added slowly so that the latter could function as a dispersing agent for the oil. As the powerful agitator breaks the stream of oil into tiny globules, the dispersing agent, CMC, prevents their coalescence. After all the ingredients are in, the finished product has the desirable homogeneous texture to enable it to pass through the colloid mill to complete the shearing and emulsifying action.

The above examples readily illustrate that the use of CMC not only fortifies the egg yolk but also serves as a dispersing agent. This enables the oil globules to be colloidally dispersed in a liquid medium and yet enables the egg yolk, regardless of its small percentage, to envelop the colloids and form a protective film around them.

While the CMC works best in a composition having a 65% minimum oil base and no starch filler, satisfactory results may also be obtained if salad dressing constitutes no more than 5% of the finished composition.

Having described my invention, I claim:

1. An emulsified, edible mayonnaise composition consisting essentially of a mixture of vegetable oil, eggs and sodium carboxy methyl cellulose, the said vegetable oil constituting at least 55% of said composition and the said sodium carboxy methyl cellulose being not substantially more than 1% by weight of the total composition.

2. An edible, mayonnaise composition consisting essentially of a mixture of vegetable oil, eggs, vinegar, water, spices and sodium carboxy methyl cellulose, the said vegetable oil constituting at least 55% of said mixture and the said sodium carboxy methyl cellulose not exceeding 1.125% of said composition.

3. An edible mayonnaise composition containing at least 65% of vegetable oil by weight and including as an added ingredient sodium carboxy methyl cellulose, said sodium carboxy methyl cellulose being not substantially more than 1% by weight of the total composition.

4. An edible composition as set forth in claim 3 in which egg yolks constitute 6% of the total composition by weight and in which not less than six ounces and not more than eight ounces of sodium carboxy methyl cellulose is used for each gallon of moisture in excess of 10% of the total moisture other than the egg moisture.

5. The method of making a mayonnaise composition, the emulsion of which is fortified by not more than 1% by weight of sodium carboxymethyl cellulose, comprising the steps of mixing a portion of the vinegar employed, water dry spices and flavoring agents into a paste, adding egg yolks to said paste and agitating to produce a uniform mixture, separately mixing all of the sodium carboxy methyl cellulose with a portion of the vegetable oil to be employed until each particle of sodium carboxy methyl cellulose is lubricated by said oil, the amount of vegetable oil used being approximately four times the weight of said sodium carboxy methyl cellulose, then slowly adding ⅓ to ½ of the lubricated sodium carboxy methyl cellulose to the paste-egg yolk mixture to thoroughly incorporate the sodium carboxy methyl cellulose into said mixture, thereafter simultaneously slowly adding the balance of said lubricated sodium carboxy methyl cellulose, vegetable oil and vinegar to the paste-egg yolk mixture while said mixture is being agitated at high speed, the said vegetable oil and said lubricated sodium carboxy methyl cellulose being added at such rates that both additions are completed at about the same time, and, thereafter, emulsifying the entire composition.

References Cited

UNITED STATES PATENTS

| | | | |
|---|---|---|---|
| 1,664,775 | 4/1928 | Epstein et al. | 99—144 |
| 2,170,518 | 8/1939 | Musher | 99—144 |
| 2,264,593 | 12/1941 | Schapiro | 99—144 |
| 2,944,906 | 7/1960 | Spitzer et al. | 99—144 |
| 2,983,618 | 5/1961 | Melnick et al. | 99—144 |
| 3,093,486 | 6/1963 | Krett et al. | 99—144 |

RAYMOND N. JONES, *Primary Examiner.*

J. M. HUNTER, *Assistant Examiner.*